(12) United States Patent
Richardson et al.

(10) Patent No.: US 7,783,689 B2
(45) Date of Patent: Aug. 24, 2010

(54) ON-SITE SEARCH ENGINE FOR THE WORLD WIDE WEB

(75) Inventors: Matthew Richardson, Seattle, WA (US); Wisam Dakka, New York City, NY (US)

(73) Assignee: Microsoft Corporation, Redmond, WA (US)

( * ) Notice: Subject to any disclaimer, the term of this patent is extended or adjusted under 35 U.S.C. 154(b) by 182 days.

(21) Appl. No.: 11/588,055

(22) Filed: Oct. 26, 2006

(65) Prior Publication Data

US 2008/0104100 A1    May 1, 2008

(51) Int. Cl.
G06F 7/00 (2006.01)
G06F 17/30 (2006.01)

(52) U.S. Cl. ............... 707/999.102; 707/705; 707/711; 707/736; 707/741

(58) Field of Classification Search ........ None
See application file for complete search history.

(56) References Cited

U.S. PATENT DOCUMENTS

| | | | | |
|---|---|---|---|---|
| 5,875,446 A * | 2/1999 | Brown et al. | | 707/3 |
| 6,516,337 B1 * | 2/2003 | Tripp et al. | | 709/202 |
| 6,581,072 B1 * | 6/2003 | Mathur et al. | | 707/104.1 |
| 6,594,682 B2 * | 7/2003 | Peterson et al. | | 718/102 |
| 6,643,661 B2 * | 11/2003 | Polizzi et al. | | 707/100 |
| 6,651,061 B2 * | 11/2003 | Unchida et al. | | 707/9 |
| 7,240,064 B2 * | 7/2007 | Risvik et al. | | 707/100 |
| 2005/0050028 A1 * | 3/2005 | Rose et al. | | 707/3 |

* cited by examiner

*Primary Examiner*—Yicun Wu
*Assistant Examiner*—Yu Zhao
(74) *Attorney, Agent, or Firm*—John R. Kelly; Westman, Champlin & Kelly, P.A.

(57) ABSTRACT

Providing updates to a computing device having a search engine capable of searching a local data store having an index with data related to a plurality of sites located on a wide area network. A first index builder capable of accessing sites on a wide area network is provided. The first index builder retrieves and analyzes data from the sites to create index data related to the sites. The method further includes communicating index data to the locally stored database for incrementally updating the index. A computing device capable of accessing a local data storage device is also provided. The device includes an index stored on the storage device including information related to data stored on the wide area network, a search engine capable of searching the index to retrieve information in response to a query, and a display.

4 Claims, 11 Drawing Sheets

ON-SITE SEARCH ENGINE FOR THE WORLD WIDE WEB

BACKGROUND

The Internet, or World Wide Web, has an extremely large and ever growing amount of information stored on billions of web pages available for access by the general public. However, due to the sheer size and nature of how data is stored and accessed, it may be difficult—if not impossible—to access large portions of the information available on the World Wide Web unless the information can be adequately searched.

A number of World Wide Web search tools and services that provide Internet searching capabilities exist. These search tools and services typically require that a user submit a query including one or more search terms to a centralized search engine after accessing the search tool via the Internet. The centralized search engine compiles a search result that includes information about web pages that match the query by comparing the search request against a previously compiled index of Internet web pages against the query. The centralized search engine then returns the search result to the user.

The centralized search engine, in the process of receiving a query and returning a search result, acquires information including the Internet address from which the search request came as well as the search terms that comprise the query. The centralized search engine may collect such information for a variety of reasons. Thus, the search requests from a particular individual or an entity such as an organization, corporation, or governmental body may be accessible through the search engine along with the Internet address of the computer from which the query was made.

Such information, if accessed by undesired and unscrupulous parties, may compromise the privacy of the individual or entity. For example, a corporation involved in confidential development programs such as research and development for new products or processes may want to search the Internet for information related to those development programs. Competitors who have access to that type of information may be able to discern the entity's confidential business strategies and gain an unfair competitive advantage. While the centralized search engine providers may never deliberately provide such information to anyone, numerous situations have been made public where information has been accessed via the Internet by individuals or entities that were not intended to have access to that particular information.

Because an individual or entity may rely on Internet search tools as an important tool to accomplish a variety of tasks, the individual or entity is potentially susceptible to a loss of productivity if for some reason Internet search engines are not accessible for any reason. In addition, because Internet search tools and services are used by an extremely large number of individuals and entities, it is extremely difficult to provide information that caters to the needs of any one particular user. Thus, the Internet search tools available today may lack the type of security, personalization, and reliability that a particular user may require.

As technological advances have been made in the electronic data storage industry, more and more data can be stored on relatively inexpensive machines. It is believed that if current trends continue, the storage capacity on a small server or a personal computer may be sufficient to store a search engine index with information about billions of web pages, similar to the size of a current commercial centralized search engine index.

The discussion above is merely provided for general background information and is not intended to be used as an aid in determining the scope of the claimed subject matter.

SUMMARY

In one exemplary embodiment, a method of providing updates to a computing device having a search engine capable of searching a local data store is discussed. The data store has data structure including an index having data related to a plurality of sites located on a wide area network. The method includes providing a first index builder capable of accessing sites on the wide area network. The first index builder retrieves and analyzes data from the sites to create index data related to the sites. The method further includes communicating index data to the local data store for incrementally updating the index.

In another illustrative embodiment, a computing device capable of accessing a local data storage device is discussed. The computing device includes an index stored on the local data storage device. The index includes information related to data stored on a plurality of sites on the wide area network.

In still another illustrative embodiment, a method of searching for information about a wide area network is discussed. The method includes providing a locally stored index containing index data related to information stored at a plurality of sites on the wide area network. The method further includes querying the locally stored index for index data including the at least one search term and displaying a result received from the query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
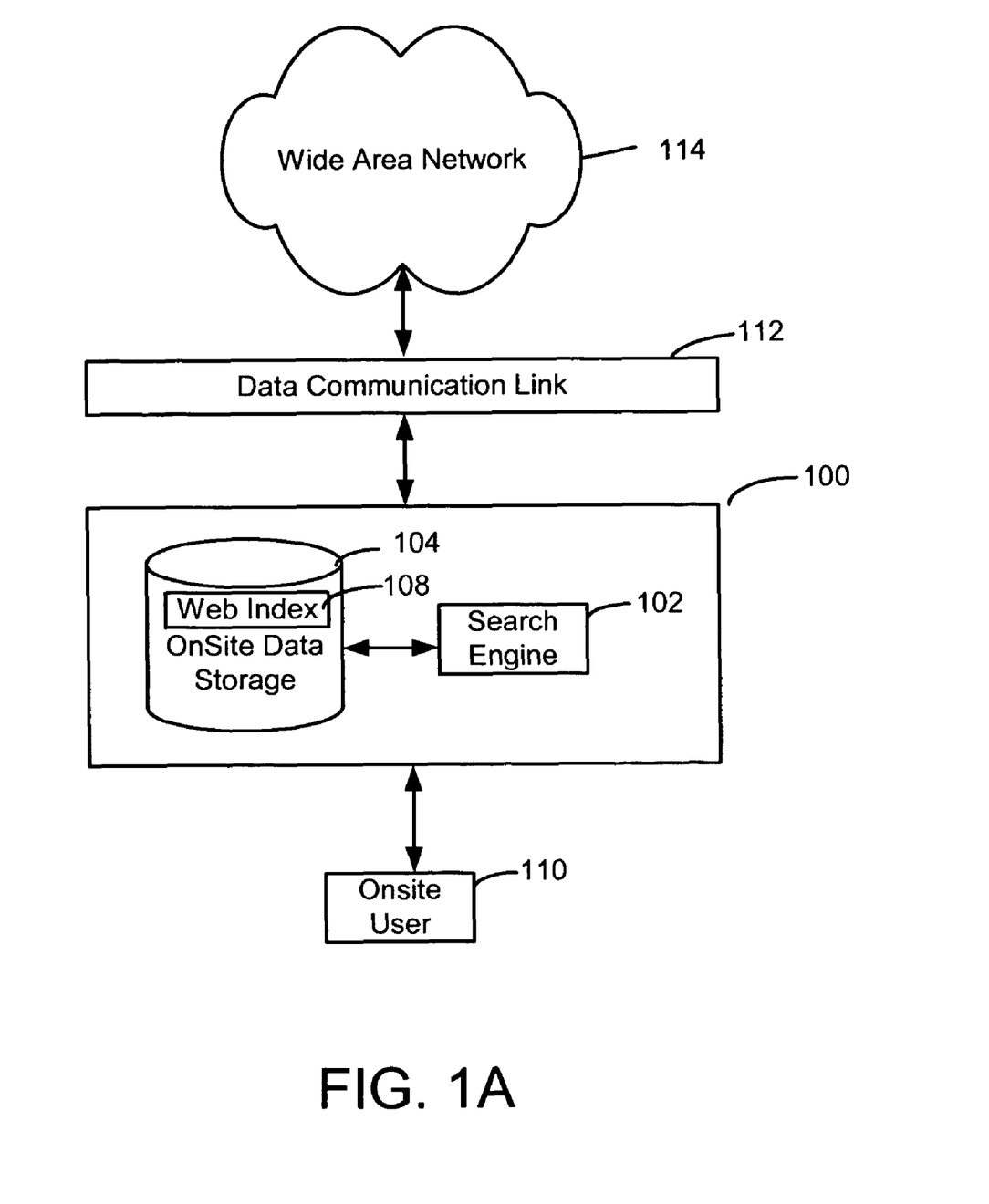
FIG. 1A is a block diagram of a locally stored search engine system for searching a locally stored index containing information about documents accessible via a wide area network according to one illustrative embodiment.
Figure 1B:
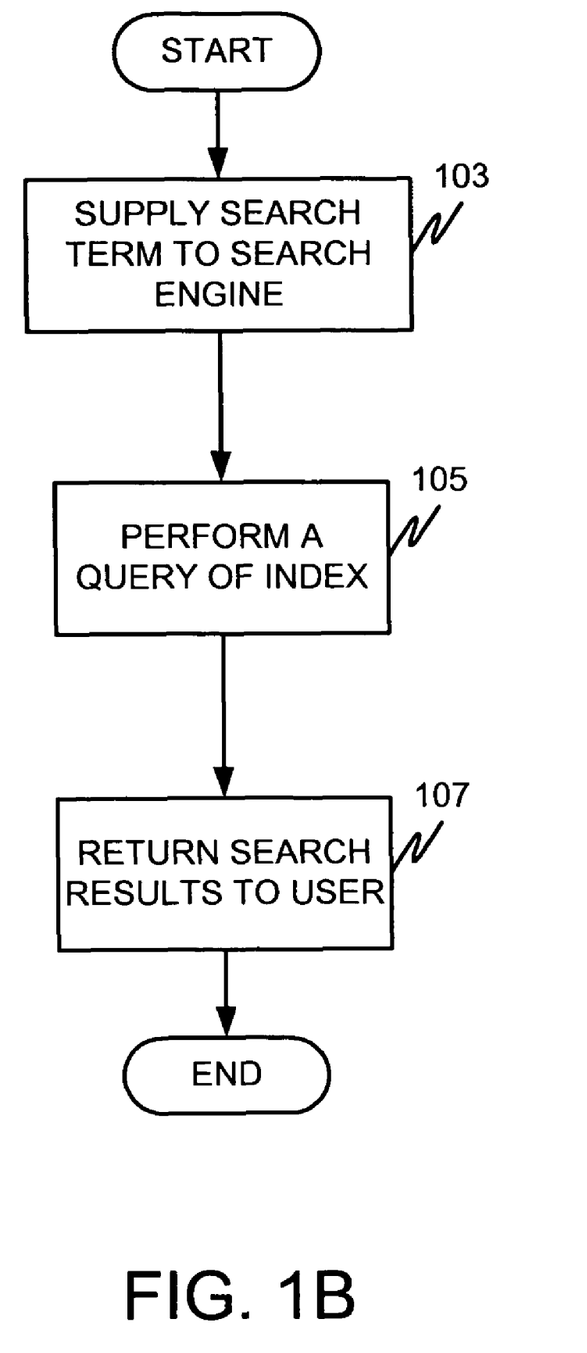
FIG. 1B is a flow diagram illustrating a method for searching the locally stored index of FIG. 1A according to one illustrative embodiment.

FIG. 1A illustrates a localized search engine system 100 for searching for information on a wide area network, such as the World Wide Web and FIG. 1B illustrates a method for searching for information on the localized search engine according to one illustrative embodiment. System 100 includes a search engine 102, which is configured to access an onsite data storage device 104. A locally stored index 108, which includes information about a large number of documents available on a wide area network 114 (e.g., the Internet), resides in the onsite data storage device 104.

A representative web index 108 can illustratively include information related to about five billion documents available on the wide area network 114, including web pages, images, videos, word processing documents, spreadsheets, presentation documents, and the like. The number of documents on the wide area network 114 about which the index 108 stores information may be any number, however, and the index 108 can store information about a larger or smaller number of documents. Similarly, it may be that as the total size of a particular wide area network 114 such as the Internet grows, the number of documents referenced in the index 108 can correspondingly increase.

An onsite user 110 can access the localized search engine system 100 to conduct a search of the web index 108. To initiate a query, user 110 supplies one or more search terms to the search engine 102, shown in block 103 of FIG. 1B. The search engine 102 then queries the index 108 to find documents that match the search terms provided by the user 110, shown in block 105. The search engine then returns a search result in response to the query provided by user 110, as is shown in block 107. In one embodiment, the search result is output to a display. The search result provides information about zero or more sites or documents on the wide area network 114 that match the query provided by the onsite user 110. The information provided by the search engine 102 includes representative text found on documents such as web pages that matched the query as well as a hyperlink or uniform resource locator (URL). If, as a result of the search, the onsite user 102 finds a relevant document, he or she can access the wide area network 114 via a data communication link 112 such as an Internet Service Provider to view or download the document.

In the illustrative embodiment, a single onsite user 110 is shown accessing the localized search engine system 100. While the localized search engine system 100 can be located in a dedicated device, such as a personal computer, it is to be understood that the localized search engine system 100 can alternatively be located on a local server, which is accessible by a plurality of local users 110. It should be further understood that localized search engine system 100 can be implemented on a plurality of computing devices at a particular site.

Figure 2A:
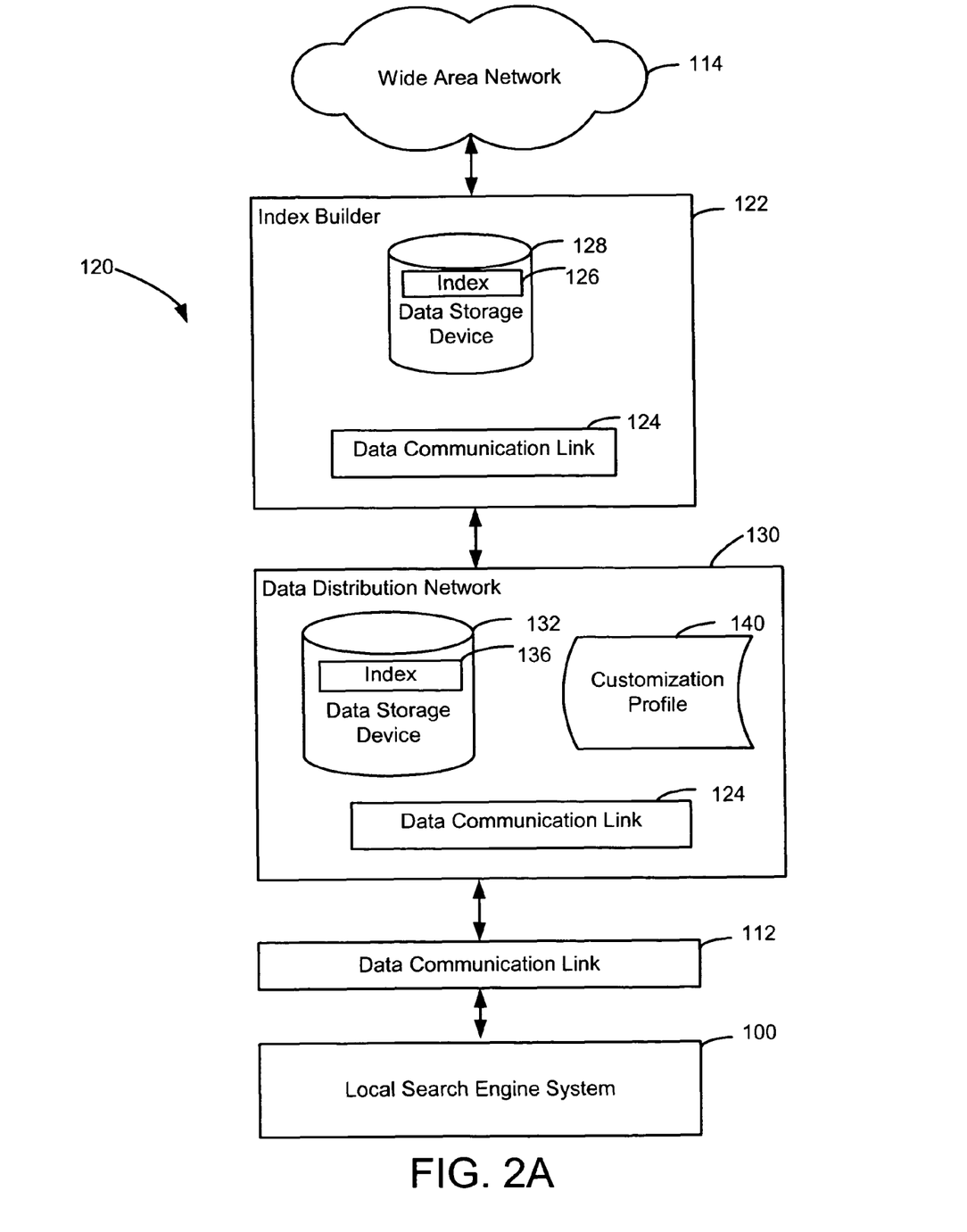
FIG. 2A is a block diagram of an index updating system for providing an updated locally stored index for the local search engine system of FIG. 1A according to one illustrative embodiment.
Figure 2B:
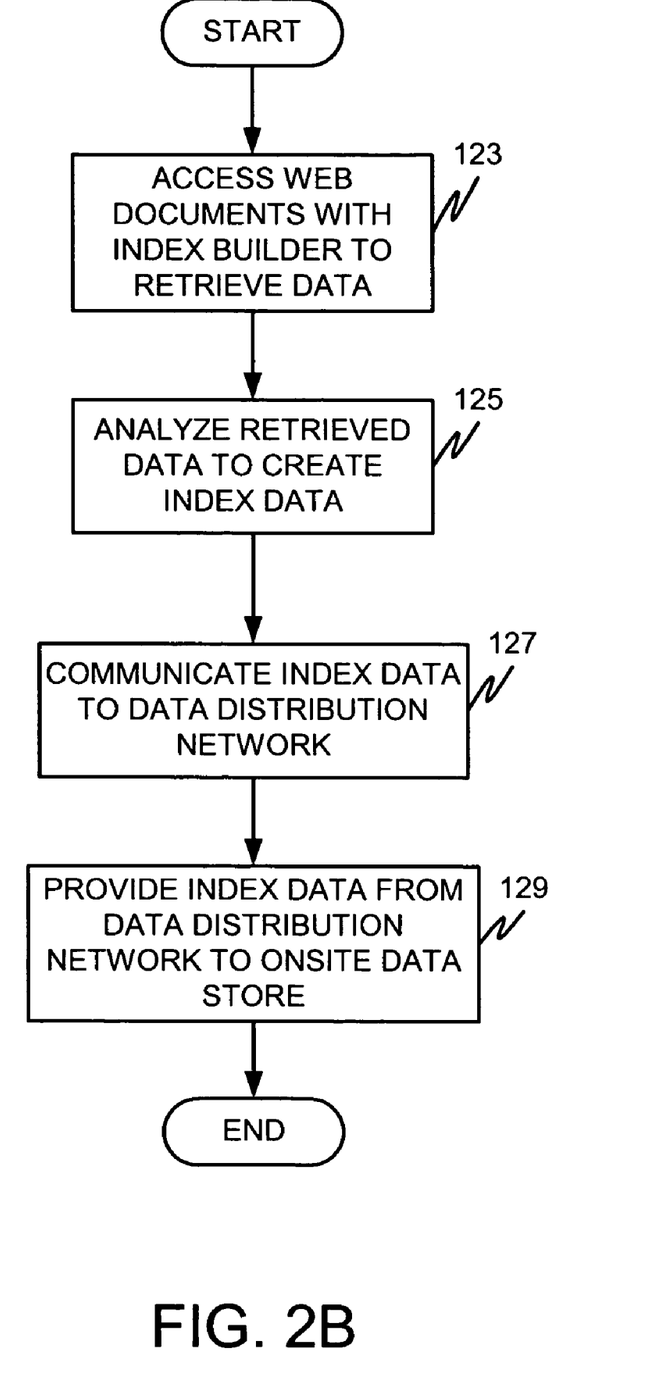
FIG. 2B is a flow diagram illustrating a method for updating the on-site search engine of FIG. 1A according to one exemplary embodiment.

Because wide area network 114, may be undergoing constant or frequent change, the index 108 may illustratively require updating on a regular basis. FIG. 2A illustrates an index updating system 120 for updating index 108 and FIG. 2B illustrates a method for updating index 108 according to one illustrative embodiment. The index updating system 120 includes an index builder 122. Index builder 122 illustratively includes a communication port 124, which is configured to provide access for the index builder 122 to a large number of web documents on a particular wide area network, which in the illustrative embodiment is the World Wide Web. Index builder 122 "crawls" from web site to web site retrieving part or all of the content of each site that it visits, shown in block 123 on FIG. 2B. The index builder 122 then analyzes the retrieved data to create index data, shown in block 125, which can be stored in index 126. Index builder 122 includes a data storage device 128, in which the index 126 is stored.

Index updating system 120 also includes a data distribution network 130. In the illustrative embodiment, the data distribution network 130 is a centralized network that includes a data storage device 132 and a communication port 134. The data distribution network 130 is capable of communicating with the index builder 122 through communication port 134. As the index 126 is updated, index builder 122 sends some or all of the index data stored in the index 126 to the data distribution network 130, as is illustrated in block 127. The data distribution network 130 receives the updated index data and stores it as an index 136 in data storage device 132. In one embodiment, when data storage device 132 is current, that is, when data storage device 132 has been updated to reflect changes made to the index 126 in the data storage device 128, data storage device 132 includes all of the information stored in index 126. Alternatively, index 136 may be considered updated and nevertheless include only a portion of the information stored in index 126.

The data distribution network 130 then communicates index data to the local search engine system 100 via data communication link 112 to provide updated index data to the index 108, as shown in block 129. While one local search engine system 100 is shown in FIG. 2A as accessing data distribution network 130, it should be appreciated that any number local search engine systems 100 may be in communication with data distribution network 130 to receive update information. In one embodiment, the data distribution network 130 provides update information to ensure that all of the information in its index 136 is provided to the local search engine system 100. Alternatively, only a portion of the information stored in the index 136 of data distribution network 130 is provided to local search engine system 100. For example, users of the local search engine system 100 may desire or be limited to receive only a portion of the data stored in index 136. Thus, updates related to that portion of index 136 are provided to the local search engine system 100, while updates to other portions of index 136 are not.

As discussed above, there may be more than one local search engine system receiving updates from the data distribution network 130. In addition, different local search engine systems may require updates of different portions of the index 136. Thus, in one illustrative embodiment, the data distribution network 130 includes a stored customization profile 140, which stores information related to updating a giving local search engine system 100. For example, the stored customization profile 140 can include information related to what portion of index 136 should be provided to a given local search engine system 100 and how often that information should be updated. The local search engine system 100 can be therefore customized by selecting portions of index 136 that are to be available to local search engine system 100 such as by subscribing to content by subject matter, author, location (such as a given web page) for example. Alternatively, each local search engine system 100 can store information relative to customization of data to be indexed in the local search engine system 100.

In one illustrative embodiment, the local search engine system 100 is in continuous communication with the data distribution network 130. For example, the data distribution network 130 may provide update information to the local search engine system 100 at a rate of 1 Mbit of bandwidth continuously. By providing a continuous stream of data, the data distribution network 130 avoids providing huge bursts of data. Alternatively, the communication between the local search engine system 100 and data distribution network 130 to provide updates from the data distribution network 130 and the search engine system 100 may be intermittent. Such updates may be made at regularly scheduled or irregular intervals.

Either of the data distribution network 130 or the local search engine system 100 may establish communication with the other to initiate a transfer of all or part of the index to the local search engine system 100. Alternatively still, the data distribution network 130 may provide a physical copy of the index such as on one or more CD-ROMs, DVD-ROMs or any other suitable portable physical storage media. The physical copy of the index information can then be loaded onto the local search engine system 100 to update its locally stored index. These can be provided pursuant to a subscription or otherwise.

Figure 3:
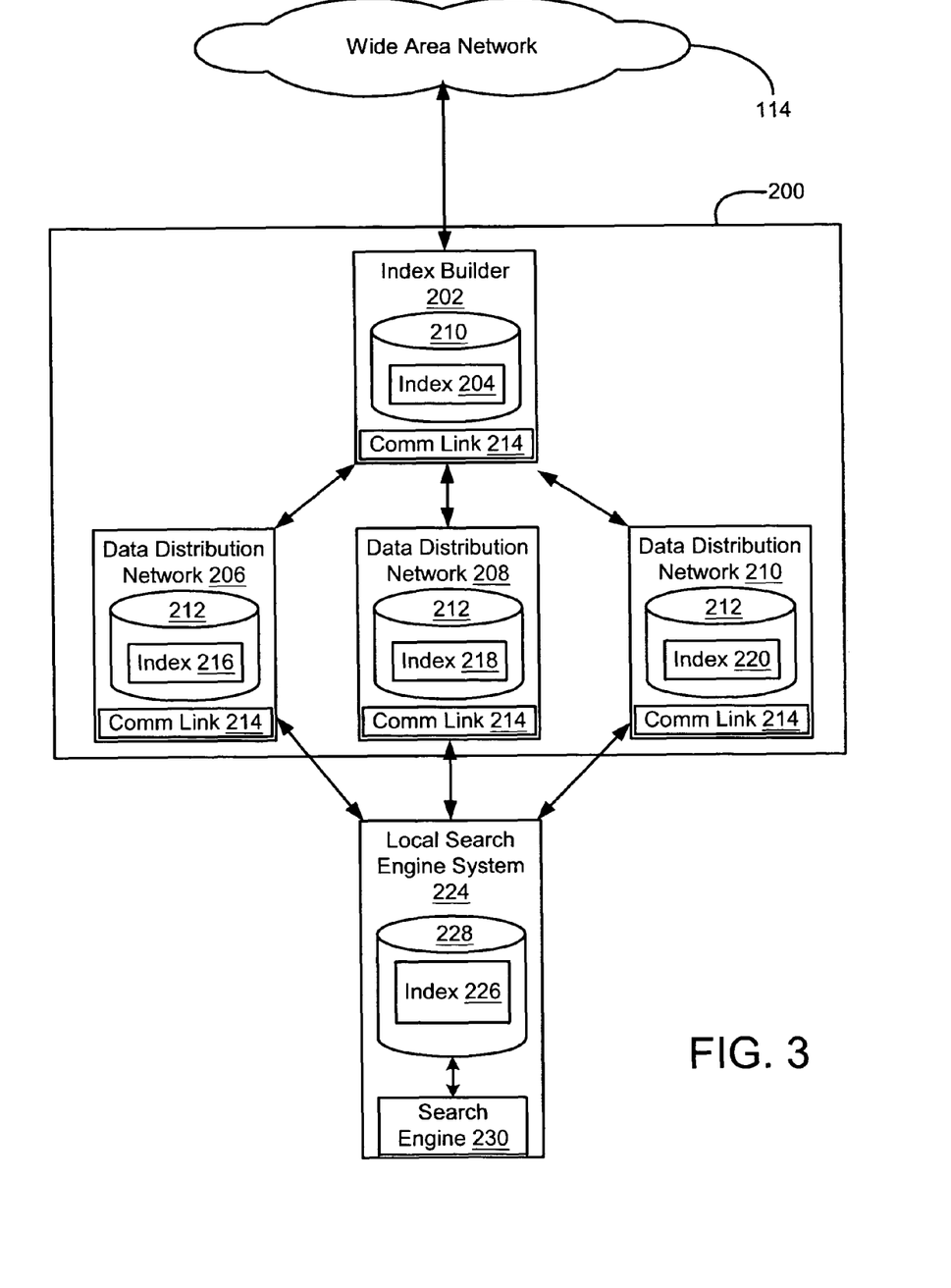
FIG. 3 is a block diagram showing the index updating system of FIG. 2A in greater detail.
Figure 4:
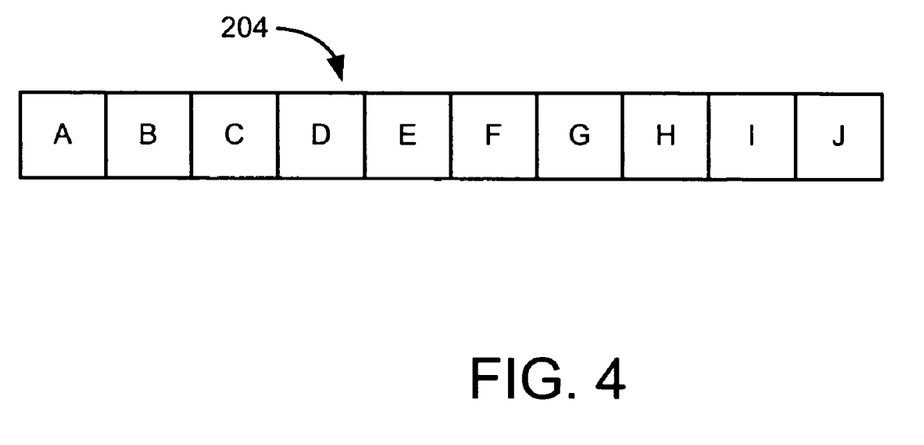
FIG. 4 is a representation of an index stored in an index builder implemented in the index updating system of FIG. 3.

FIG. 3 illustrates an index updating system 200 for updating a local search engine system 224 according to another exemplary embodiment. Index updating system 200 includes an index builder 202. Index builder 202 accesses a large number of web documents on the wide area network 114 to create and update an index 204. A representation of index 204 is shown in FIG. 4. As shown, index 204 is represented as being divided into partitions or portions A-J. It is to be understood, however, that the partitions A-J are shown for illustrative purposes only, which will become apparent below. In actuality, the data included in index 126 may, but need not, be divided into any type of partition whatsoever.

Returning again to FIG. 3, index updating system 200 includes three data distribution networks 206, 208, and 210. Each of the three data distribution networks 206, 208, and 210 has a data storage device 212 and a data communication link 214 so that each of the three data distribution networks 206, 208, and 210 are capable of being in communication with the index builder 202. It should be appreciated that although FIG. 3 shows three data distribution networks, any number of data distribution networks may be employed.

By providing a plurality of data distribution networks, index updating system 200 communicates with each of the data distribution networks 206, 208, and 210 to update them with different information. For example, in one illustrative embodiment, data distribution network 206 communicates with index builder 202 to receive the information that is deemed to be part of partitions A-C of index 204. This data is used to create or update an index 216, which is stored in a data storage device 212 of data distribution network 206. Similarly, data distribution network 208 receives and stores the information relative to partitions D-F as an index 218 in its data storage device 212. Finally, data distribution network 210 receives and stores information that is deemed to be part of partitions G-J as an index 220 in its data storage device 212. Local search engine system 224 thus illustratively receives information from indices 216, 218, and 220 from data distribution networks 206, 208, and 210 to create an index 226, which is stored in a data storage device 228. Search engine 230 then accesses the index 226 in response to a query by an onsite user.

The use of multiple data distribution networks can provide a number of advantages. Suppose, for example, that the portion of index 204 represented by partitions A-C indexes web pages or documents with high priority content that is known to be updated often. By high priority content, it is meant that the content has been deemed to be most relevant or is accessed frequently by users of local search engine systems such as local search engine system 224. By locating high priority, frequently updated data in data distribution network 206 and having data distribution network 206 communicate more frequently with index builder 202, index 216 is more frequently updated than other indices, which store data that is less likely to be accessed and have new or updated content. This results in a more efficient data transfer between the index builder 202 and the data distribution networks 206, 208, and 210.

Figure 5:
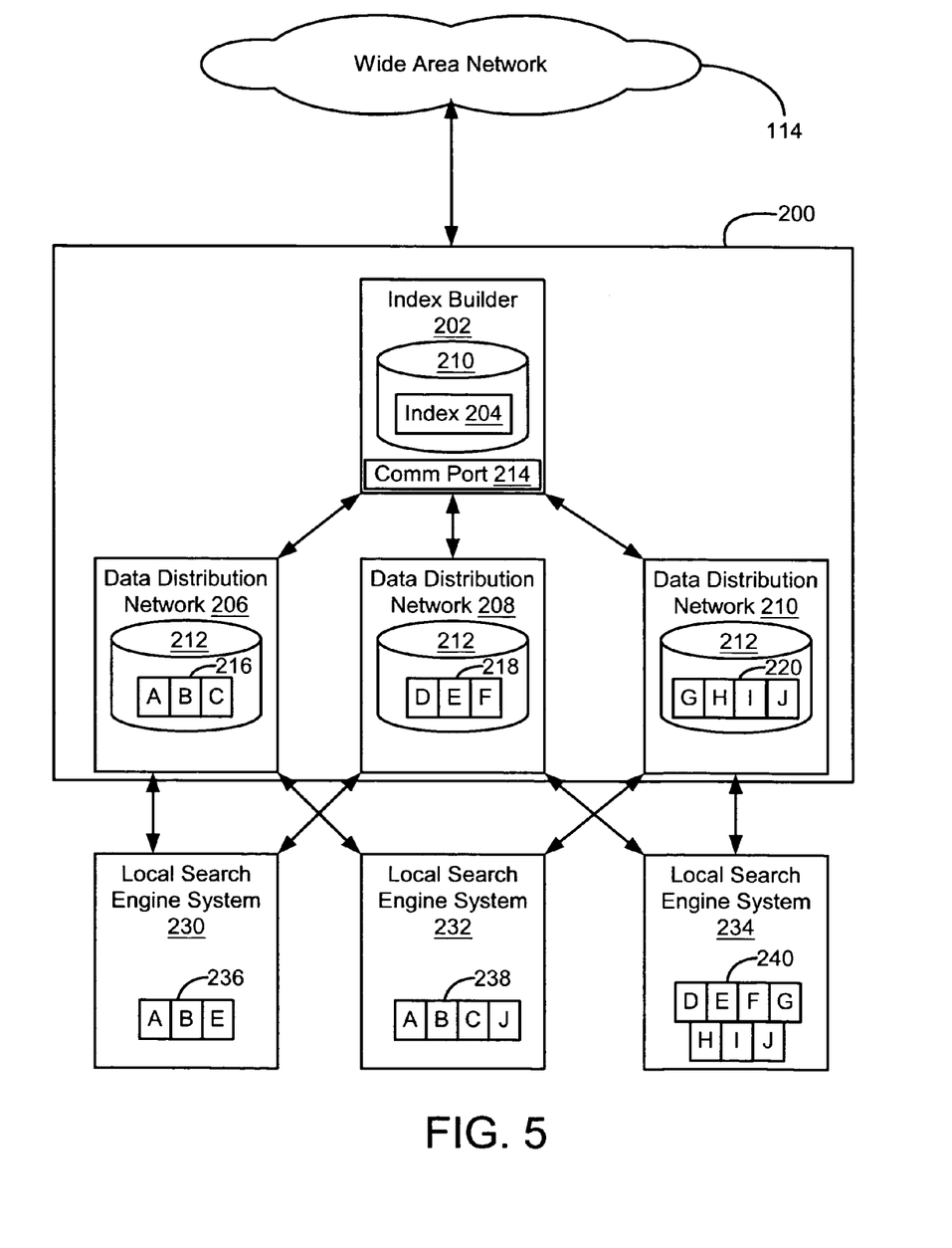
FIG. 5 is a block diagram of an index updating system for updating a locally stored index of a local search engine system according to another illustrative embodiment.

In addition, as discussed above, different local search engine systems may have local indices with different content. As an illustrative example, FIG. 5 provides for three local search engine systems 230, 232, and 234. In the illustrative embodiment, local search engine system 230 requires an index 236 that includes the data in partitions A, B, and E. Thus, local search engine 230 necessarily receives updates from data distribution networks 206 and 208. In addition, local search engine system 232 has an index that requires the data from partitions A, B, C, and J. Local search engine 232 thus receives updates from data distribution networks 206 and 210. Similarly, local search engine 234 requires the data from partitions D-J. Local search engine 234 therefore receive updates from data distribution networks 208 and 210.

It should be understood from the discussion above that each and every local search engine system can have a different index from every other local search engine system. By having a plurality of data distribution networks, each particular local search engine can access only those data distribution networks necessary to update the universe of its particular index. Further, if the owner of a particular localized search engine wishes, he or she may subscribe to all or part of the content provided by a particular data distribution network. Alternatively, the localized search engine system 100 can subscribe to certain data distribution networks based upon the content of searches performed by onsite users.

Figure 6:
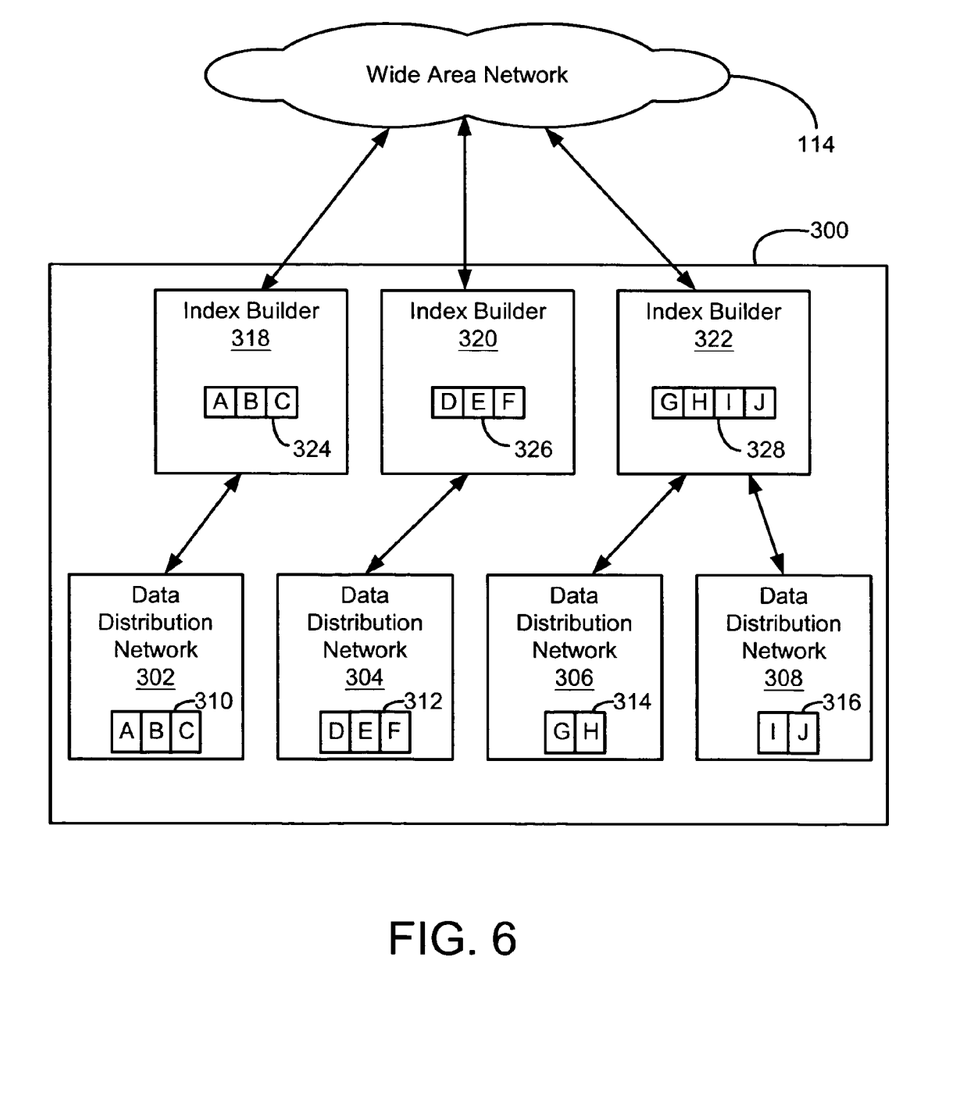
FIG. 6 is a block diagram of an index updating system for updating a locally stored index of a local search engine system according to yet another illustrative embodiment.

In yet another illustrative embodiment, shown in FIG. 6, an index updating system 300 is shown. Index updating system 300 includes a plurality of data distribution networks 302, 304, 306 and 308 having indices 310, 312, 314 and 316, respectively. Index 310 is divided into partitions A, B, and C, index 312 is divided into partitions D, E, and F, index 314 is divided into partitions G and H, and index 316 is divided into partitions I and J.

In addition, index updating system 300 has three index builders 318, 320, and 322. The three index builders 318, 320, and 322 build and update indices 324, 326, and 328, respectively. Each of the index builders 318, 320, and 322 accesses different sets of web sites to build and update their indices 324, 326, and 328. Index builders 318, 320, and 322 are illustratively shown as accessing mutually exclusive sets of web sites, but alternatively, there may be some overlap between the sets of web sites accessed by different indices without departing from the scope and spirit of the discussion. Index builder 318 communicates with data distribution network 302 to update its index 310 and index builder 320 communicates with data distribution network 304 to update its index 312. Index builder 318 communicates with data distribution networks 306 and 308 to update their indices 314 and 316. Local search engine systems 330, 332 and 334 are in communication with index updating system 300 to receive updates for their respective indices 336, 338, and 340.

While the index updating system 300 illustrates an embodiment with three index builders, it is to be understood that a given index updating system can have any number of index builders. Further, each index builder can be interfaced with any number of data distribution members. By providing a plurality of index builders, index updating system 300 allows each index builder to crawl a portion of the wide area network (e.g., World Wide Web), instead of having a single index builder crawl over the entire web to create a single index.

Figure 7:
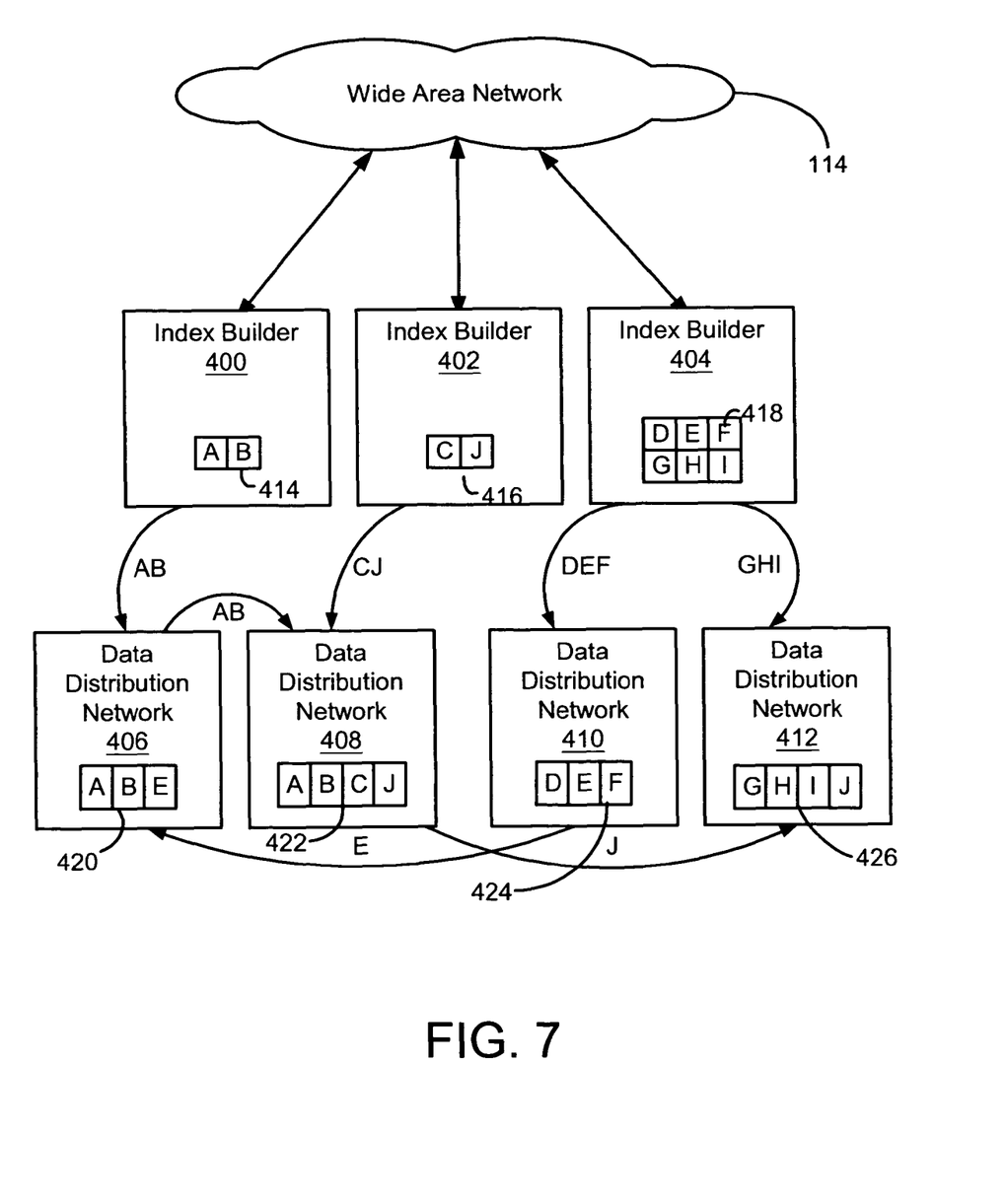
FIG. 7 is a block diagram of a plurality of local search engine systems providing information along a peer to peer network to update a locally stored index resident in each of the local search engine systems according to one illustrative embodiment.

FIG. 7 illustrates a plurality of data distribution networks that communicate with each other to provide updates for indices using a peer-to-peer arrangement according to yet another illustrative embodiment. Once again, the universe of websites provided in an index from the World Wide Web 114 is represented as being partitioned into partitions A-J. Three separate index builders 400, 402, and 404 are provided to receive data from sites and documents accessible on the wide area network 114 and create indices 414, 416, and 418. Data distribution networks 406, 408, 410, and 412 access the index updating systems 400, 402, and 404 as shown. That is, data distribution network 406, which has an index that is desired to be populated with the data in partitions, A, B, and J, accesses index builder 400 to receive the data from partitions A and B. Similarly, data distribution network 408, which has an index 422 that is desired to be populated with the data from partitions, A, B, C, and J, accesses index updating system 402 to receive the data from partitions C and J. Data distribution network 408 also communicates with data distribution network 406 to receive data from the data distribution network 406 corresponding to that which is identified as partitions A and B. Thus, when data distribution network 406 receives an update from index builder 400, the data that it receives from partitions A and B is subsequently communicated to data distribution network 408.

Similarly, data distribution networks 410 and 412 receive data from index builder 404 relative to the partitions D, F, G, H, and I, respectively. Data distribution network 410 provides the data from partition E to data distribution network 406. Likewise, data distribution network 408 provides data from partition J to data distribution network 412.

By providing the ability to transfer information from one peer to, another, it is possible to provide more efficient updates for the data distribution networks. Because the number of data transfers from each of the index builders is reduced, the index builders can apply more resources to crawling through the wide area network 114 to update its indices. The corresponding peer-to-peer network between the data distribution networks thereby distributes data transfers away from the index builders to the data distribution networks, which can more efficiently transfer data between each other than to have each individual data distribution network accessing each index builder as would otherwise be required.

In one illustrative embodiment, the data in partitions A and B includes high priority, frequently updated data. The data of partitions A and B from index 414 is accessed by a single data distribution network 406. Data distribution network 406 then transfers that data to data distribution network 408, which in turn provides that data to both data distribution networks 410 and 412. Therefore, the distributed peer-to-peer network information that is most critical is being passed from the index updating system 400 as infrequently as possible. The peer-to-peer network takes advantage of processing capability and communication capability between the data distribution networks to pass the high priority partitions A and B to each of the local search engine systems 408, 410, and 412. Lower priority data such as that from partitions C through J can be passed from an index updating system such as 402 to a single data distribution network 408 and subsequently pass on the peer-to-peer network to other data distribution networks. Alternatively, low priority, low occurrence partitions may be directly accessed by the index updating system because of the lower drain on resources for the index updating systems. FIG. 7 illustrates one particular embodiment of a peer-to-peer sharing network. It should be understood and appreciated that other variations may exist. For example, two or more local search engine systems can engage in a peer-to-peer exchange of data.

Figure 8:
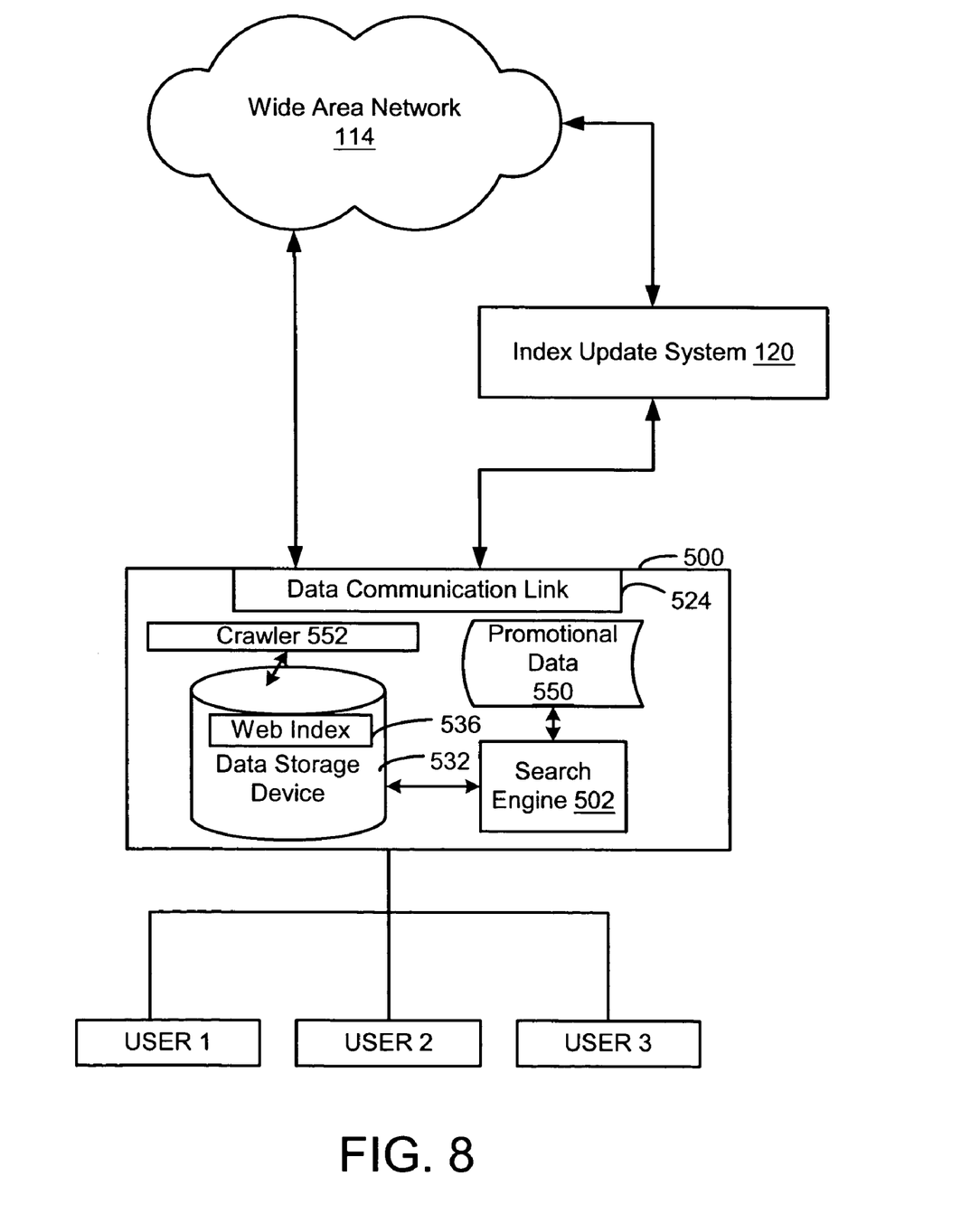
FIG. 8 a block diagram of a locally stored search engine system for searching a locally stored index containing information about documents accessible via a wide area network according to another illustrative embodiment.

FIG. 8 illustrates localized search engine system 500 in accordance with another illustrative embodiment. Localized search engine system 500 includes a search engine 502 and a data storage device 532, in which a localized web index 536 is stored. Localized search engine system 500 has a communication link 524, which the localized search engine system 500 uses to communicate with index update system 120 to receive updates for its web index 536.

In addition, localized search engine system 500 includes a crawler 552, which employs data communication link 524 so that it can crawl sites on the World Wide Web 114 to update its web index 536. Crawler 552, in one illustrative embodiment, is configured to crawl certain high priority sites to provide up-to-date data from those sites. Localized search engine system 500 also optionally can crawl data storage devices located within a particular computer in which the search engine system 500 is present or data storage devices located within a closed intranet, such as an organization's computer system.

Further, localized search engine system 500 includes a promotional data store 550. The promotional data store 550 includes content related to promotional information such as advertisements, public service announcements and the like. Search engine 502 can access the promotional data store 550 to receive the promotional information that can illustratively be output onto the onsite user's display as they are searching the Internet. The particular promotional information that a user is shown can be dependent upon the content of particular searches, or specific to a particular organization. Search engine system 500 is illustratively configured to access data communication link 524 to receive promotional data to be stored in the promotional data store 550. This promotional data can be accessed directly, for example, from an advertising agency site located on the World Wide Web 114 or alternatively through index update system 120. Promotional data can be provided to the search engine system 500 using other approaches as well. For example, promotional data can be provided on a disk that can be accessed locally to upload information to the promotional data store 550. Because the localized search engine 502 accesses the promotional data store 550 to retrieve promotion information, it is not necessary to provide information to the advertising agency regarding how or when particular advertisements were accessed. This may be advantageous, since it may not be desirable to provide that type of information in some circumstances.

The embodiments discussed herein provide important advantages. The localized search engine systems are capable of providing effective data access on wide area networks such as the World Wide Web without the attendant risk of having sensitive data made public. Onsite search engine systems can have customized indices to ensure that those persons who use them are getting the most update information available for high priority sites. In addition, localized search engines are suitable for processing long latency queries that require large amounts of computing resources.

Figure 9:
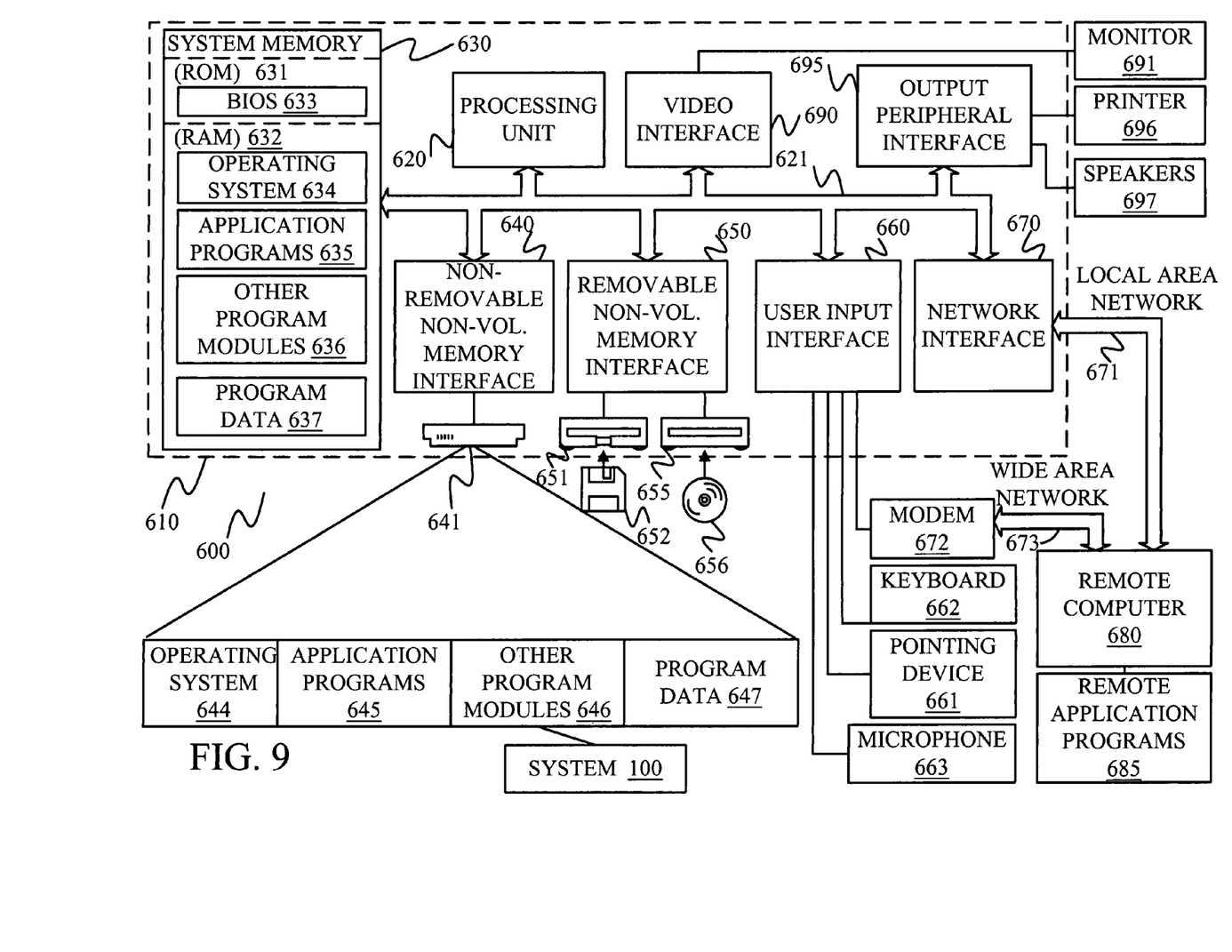
FIG. 9 is a block diagram of one computing environment in which some embodiments may be practiced.

FIG. 9 illustrates an example of a suitable computing system environment 600 on which embodiments such as localized search engine system 100 described above may be implemented. The computing system environment 600 is only one example of a suitable computing environment and is not intended to suggest any limitation as to the scope of use or functionality of the claimed subject matter. Neither should the computing environment 600 be interpreted as having any dependency or requirement relating to any one or combination of components illustrated in the exemplary operating environment 600.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 9, an exemplary system for implementing some embodiments includes a general-purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 9 illustrates operating system 634, application programs 635, other program modules 636, and program data 637.

The computer 610 may also include other removable/non-removable volatile/nonvolatile computer storage media. By way of example only, FIG. 9 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 9, provide storage of computer readable instructions, data structures, program modules and other data for the computer 610. In FIG. 9, for example, hard disk drive 641 is illustrated as storing operating system 644, application programs 645, other program modules 646 such as the components of system 100, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies.

A user may enter commands and information into the computer 610 through input devices such as a keyboard 662, a microphone 663, and a pointing device 661, such as a mouse, trackball or touch pad. Such devices can be used to provide input for search engine 102. Other input devices (not shown) may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. Monitor 691 can display, for example, the results of a search engine query. In addition to the monitor, computers may also include other peripheral output devices such as speakers 697 and printer 696, which may be connected through an output peripheral interface 695.

The computer 610 is operated in a networked environment using logical connections to one or more remote computers, such as a remote computer 680. The remote computer 680 may be a personal computer, a hand-held device, a server, a router, a network PC, a peer device or other common network node, and typically includes many or all of the elements described above relative to the computer 610. The logical connections depicted in FIG. 9 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. Such a connection can be used, for example to access a data distribution network 130 so as to receive index data. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 9 illustrates remote application programs 685 as residing on remote computer 680. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of providing index information to a computing device having a search engine capable of searching a local data store, that is local to the computing device, comprising:
providing a first index builder, that is remote from the computing device, the first index builder accessing a first set of remote sites, remote from the computing device, over a wide area network to retrieve and analyze data from the first set of remote sites and create a first index of data stored on the first set of remote sites;
building the first index at the first index builder;
communicating the first index from the first index builder to a first data distribution network, the first data distribution network being remote from the first index builder and from the computing device and from the first set of remote sites;
communicating the first index from the first data distribution network to the local data store on the computing device so the first index is searchable by the search engine on the computing device, the computing device implementing a user interface for the user to input a query and receive search results;
providing a second index builder remote from the first index builder and the computing device, accessing a second set of remote sites over the wide area network, wherein the second index builder accesses sites not accessed by the first index builder, to retrieve and analyze data from the second set of remote sites to create second index data that indexes information on the second set of remote sites and wherein the second index builder communicates the index data to the local data store on the computing device to update the first index;
intermittently accessing the first and second sets of remote sites with the first and second index builders, respectively;
generating, at the first and second index builders, updated index data indicative of incremental updates to the first index;
receiving, in response to a request from the computing device, the updated index data at the local data store on the computing device;
updating the first index, with the updated index data, to obtain an updated first index on the computing device;
communicating the first index and updated index data from the first data distribution network to a second data distribution network remote from the first data distribution network; and
communicating the first index and updated index data from the second data distribution network to another local data store on another computing device.

2. The method of claim 1 and further comprising communicating the second index data from the second index builder to the first data distribution network.

3. The method of claim 1, wherein the step of receiving updated index data from the first data distribution network at the local data store on the computing device includes communicating at least a portion of the updated index data available to the first data distribution network based on a customization profile indicative of the portion of the first index data on the first data distribution network to be provided to the local data store on the computing device.

4. The method of claim 1, and further communicating updated index data from the first data distribution network to the local data store on the computing device continuously.

* * * * *